United States Patent [19]

Skolnik

[11] Patent Number: 4,526,390

[45] Date of Patent: Jul. 2, 1985

[54] TOY VEHICLE

[76] Inventor: Arthur M. Skolnik, 612 - 36th Ave., Seattle, Wash. 98122

[21] Appl. No.: 477,355

[22] Filed: Mar. 21, 1983

[51] Int. Cl.³ .............................................. B62D 7/00
[52] U.S. Cl. ............................ 280/87.04 R; 280/62; 280/282; 280/293; D21/80
[58] Field of Search ............... 280/87.04 R, 87.04 A, 280/87.04 B, 87.05 R, 23, 293, 62, 235, 239, 282; D12/112, 113; D21/71, 80

[56] References Cited

U.S. PATENT DOCUMENTS

| D. 145,624 | 9/1946 | Huebner | D21/80 |
| D. 146,061 | 12/1946 | Patner | D21/80 |
| D. 178,619 | 8/1956 | Tonelli | D21/80 |
| 210,435 | 12/1878 | Root | 280/87.04 R |
| D. 244,479 | 5/1977 | Pasin | D21/80 |
| D. 256,035 | 7/1980 | Lockhart | D21/81 |
| 1,664,858 | 4/1928 | Headley | 280/87.04 R |
| 3,140,100 | 7/1964 | Nichols et al. | 280/87.04 R |
| 4,071,261 | 1/1978 | Winchell | 280/220 |

Primary Examiner—Joseph F. Peters, Jr.
Assistant Examiner—Mitchell J. Hill
Attorney, Agent, or Firm—Finnegan, Henderson, Farabow, Garrett & Dunner

[57] ABSTRACT

The vehicle has a three wheel, triangular wheelbase and a pyramid-shaped frame formed of four tubular side members and an inclined tubular steering fork supported rotatively by the side members adjacent its upper and lower ends. Handle bars located generally above the rear wheels rotate the steering fork to turn a front wheel located adjacent the front corner of the frame for steering the vehicle. Two spaced apart rear wheels are mounted for rotation about a common axis adjacent the rear corners of the frame. A platform for supporting a rider is mounted by the frame between the rear wheels, and forms a support surface so constructed and arranged with respect to the handle bars and rear wheels that the vehicle may be tilted onto two of its three wheels at a time, and then may be balanced in that position so as to perform a "wheelie" or similar maneuver, merely by concentrating or shifting the weight of the rider on the support surface and applying fore, aft or lateral balancing forces to the handle bars.

12 Claims, 7 Drawing Figures

TOY VEHICLE

BACKGROUND OF THE INVENTION

This invention relates to toy vehicles and, more particularly, to three wheel scooter-like vehicles.

Vehicles of this type generally are intended for use by small children who lack the agility and muscular development to operate tricycles and bicycles. These vehicles therefore are designed to provide stability and simplicity of operation, often at the expense of other desirable features such as versatility, maneuverability, and agility.

A typical three wheel scooter includes a steerable front wheel and two spaced apart rear wheels, together with a support platform located between the front and rear wheels. This platform is mounted at the same level or is depressed below the level of the wheel axles to provide a low center of gravity. The handle bars for steering the front wheel are mounted atop a vertical support located at the front end of the vehicle for access by a child standing on the platform. Due to the forward location of the handle bars, the child tends to maintain his or her weight on the platform near the middle of the scooter. As a consequence, all three vehicle wheels are in continuous contact with the ground, so the vehicle tends to remain upright and is resistant to tipping forces.

As will now be apparent, the typical three wheel scooter is unsatisfactory to more developed children, who desire to tip and balance their vehicles with selected wheels out of contact with the ground, to ride backwards, and to perform other tricks or maneuvers not attainable with three wheel scooters due to the inherent limitations designed into such vehicles. One such maneuver, known as a "wheelie," involves lifting the front wheel while the remaining wheel or wheels remain in contact with the ground. For this reason, such children prefer more complex and hence expensive toy vehicles such as bicycles.

SUMMARY OF THE INVENTION

This invention provides a toy vehicle which possesses the inherent stability of three wheel scooters of the type described above, together with the versatility, maneuverability and agility heretofore found only in other types of toy vehicles. According to one presently preferred embodiment of this invention, the toy vehicle includes a body supported by three wheels arranged in a triangular wheelbase, steering means operative from a position generally above two of the wheels for turning the third wheel, and means forming a support surface so constructed and arranged with respect to the steering means and the two wheels that the vehicle may be tilted onto any two of its three wheels at a time and then may be balanced in that position by application of weight to the support surface and applying a balancing force to the steering means.

Preferably, the body is made up of a pyramid-shaped frame having a triangular base and planar sides bounded by elongated, preferably tubular, members. The forwardmost member is supported rotatively by the remaining members and acts as a steering fork for turning the steerable third or front wheel. Due to the pyramidal frame configuration, the steering fork is inclined so that the steering means are generally above the first two or rear wheels and are accessible to a rider standing erect on the support surface adjacent the rear of the vehicle. To provide for lifting of the front wheel, the support surface includes a rear portion which terminates at a location spaced rearwardly of the axis of rotation of the rear wheels. Thus, it is possible, by concentrating or shifting weight to the rear portion of the support surface, to cause the front wheel to lift off the ground in a "wheelie," while balancing the vehicle in a desired angle of tilt through application of an appropriate balancing force to the steering means. Similarly, by concentrating or shifting weight to one side of the support surface or the other, it is possible to cause the opposite rear wheel to lift off the ground, again while balancing the vehicle through application of an appropriate balancing force to the steering means.

Thus, it will be appreciated from the foregoing summary that the location and construction of the support surface, together with the accessibility of the steering means to a rider standing erect on the support surface adjacent the rear of the vehicle, provide the toy vehicle of this invention with unique characteristics not found in the typical three wheel scooter mentioned above. Further, the preferred tubular frame construction, when utilized in this invention, tends to reduce the weight of the vehicle, providing even more advantages.

These and other features, objects, and advantages of this invention will become apparent from the detailed description and claims to follow, taken in conjunction with the accompanying drawings in which like parts bear like reference numerals.

DETAILED DESCRIPTION OF THE DRAWINGS

Figure 1:
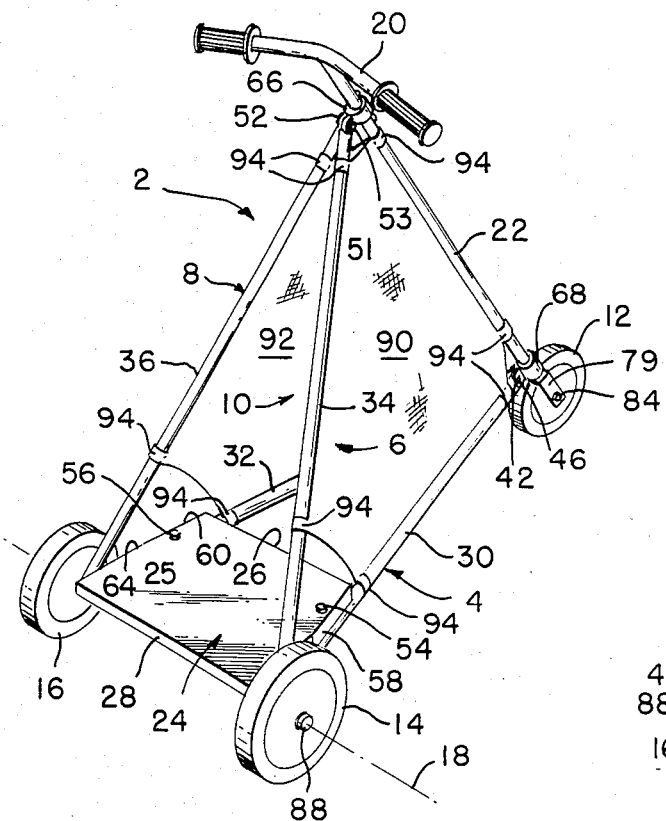
FIG. 1 is a perspective view of the toy vehicle of this invention.
Figure 2:
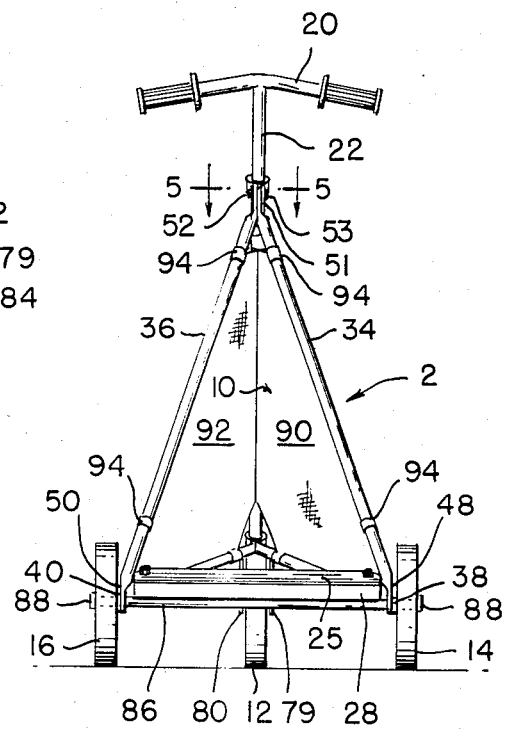
FIG. 2 is a rear elevational view of the FIG. 1 vehicle.

Referring to FIGS. 1-4, one presently preferred embodiment of this invention is comprised of a pyramid-shaped body (generally referenced by numeral 2) having a three cornered, triangularly outlined base 4, two generally equilaterally outlined sides 6 and 8, and an open rear end 10 of triangular but smaller outline than the sides. Body 2 is supported by three wheels 12, 14 and 16 located adjacent the corners of base 4 and arranged in a triangular wheelbase, in which the front wheel 12 is steerable and the two rear wheels 14 and 16 are spaced apart for rotation about a common axis 18. In the example illustrated, front wheel steering is provided by handle bars 20 mounted atop an inclined steering fork 22, although other types or forms of handle bars, steering wheels, tillers and the like could be used. As will be apparent from FIG. 3, handle bars 20 are located generally above the rear wheels 14 and 16, unlike the customary positioning of handle bars in typical three wheel scooters mentioned above. To this end, the length and angle of inclination of steering fork 22 are selected to position the handle bars at the desired location above wheels 14 and 16, preferably slightly forward of axis 18.

A platform 24 mounted by body 2 between the rear wheels forms a support surface 25. In the example, surface 25 is flat and is generally coplanar with the base 4, although it is offset slightly therefrom in relation to thickness of platform 24. While preferably platform 24 is formed from a rigid panel composed of appropriate material, such as wood, it could be formed of molded plastic, metal or other sheet-like material of reduced thickness. As most clearly shown in FIG. 4, platform 24 has a plan profile which coincides with the outline of the base 4.

Figure 3:
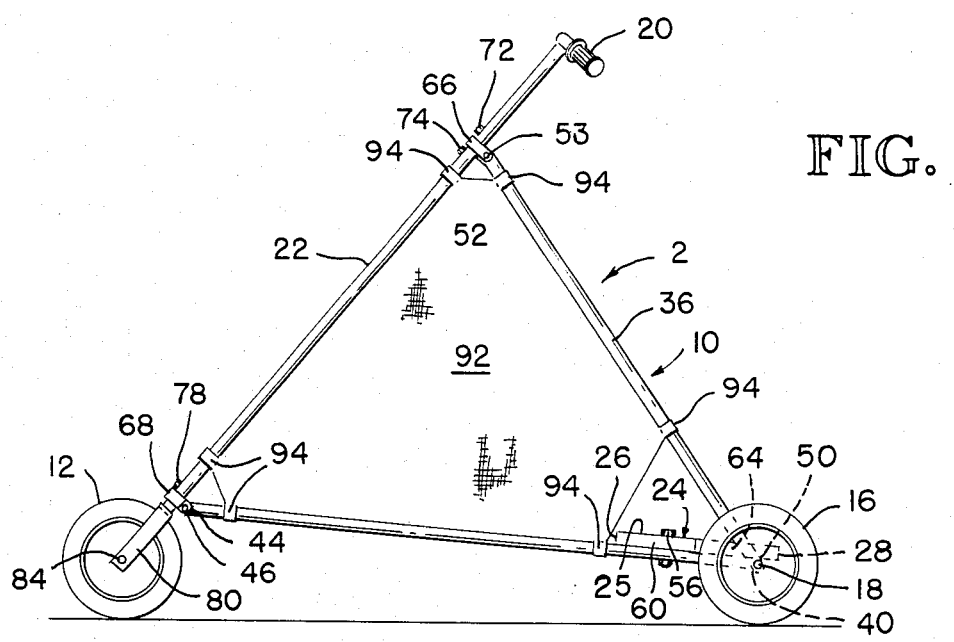
FIG. 3 is a side elevational view of the FIG. 1 vehicle.
Figure 4:
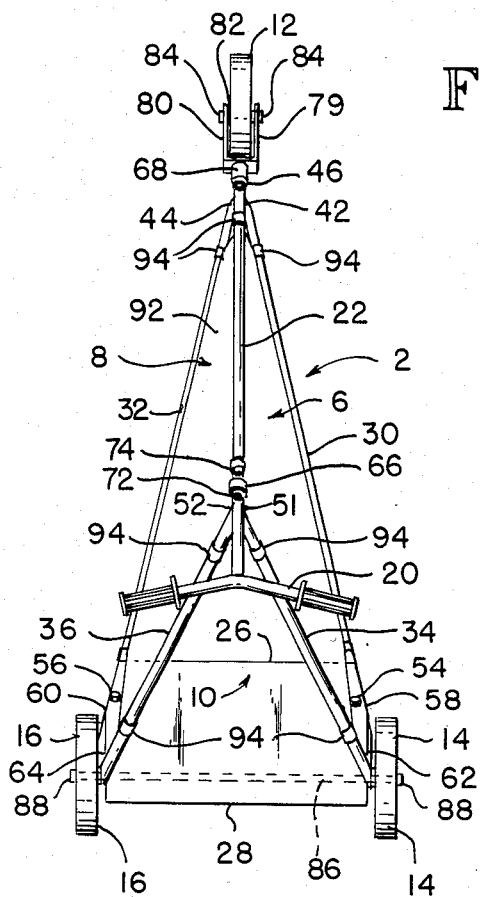
FIG. 4 is a top plan view of the FIG. 1 vehicle.

Referring in particular to FIG. 3, surface 25 extends from a front edge 26, over the axis 18, and terminates at a rear edge 28. The spacing between rear edge 28 and axis 18 is dependent upon the diameter of rear wheels 14 and 16 and the length of body 2. The practical extent of the spacing between rear edge 28 and axis 18 is of course limited by the ground clearance necessary when the vehicle is tilted with the front wheel off the ground, in a so-called "wheelie," as will be described presently. In the example, wheels 14 and 16 are six inches in diameter, and in this case that spacing should be about 0.5 to 2 inches, preferably about 1.5 inches.

Still referring to FIG. 3, front edge 26 is located beneath and slightly to the rear of handle bars 20. It could, however, be located further forward if it is desirable to extend the platform to provide additional area to surface 25, for example to permit a rider to sit facing forward on the support surface with his or her feet resting upon a forward extension (not shown) of surface 25. It is of course still possible to assume this position with the platform illustrated simply by resting the feet on forward portions of the body.

Figure 5:
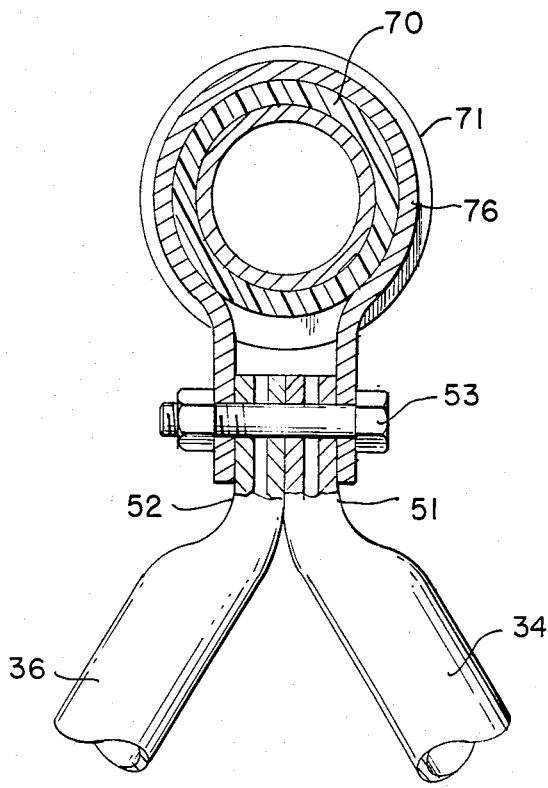
FIG. 5 is a section taken along line 5—5 in FIG. 2, in expanded scale.

Referring again to FIGS. 1–4, body 2 is comprised of a frame made up of four mutually fixed side members 30, 32, 34 and 36, and a fifth movable member which constitutes the steering fork 22. Members 30 and 32 form a V-shaped base frame having two spaced apart rear ends 38 and 40 and two forwardly convergent coplanar sides bounding the edges of base 4. Their front ends 42 and 44 are secured together at 46, preferably by bolting, although they would be welded or otherwise secured. Members 34 and 36 form a V-shaped support frame having two spaced apart rear ends 48 and 50, which respectively abut against rear ends 38 and 40, and two upwardly convergent, forwardly inclined sides bounding the upper edges of sides 6 and 8. Their upper ends 51 and 52 are secured together at 53, preferably in the same manner as the securement at 46. The preferred construction of members 30, 32, 34, and 36 is tubular steel or aluminum, with their ends flattened and closed to provide flat abutment surfaces and hole facings, as depicted in FIG. 5. These members, however, could be formed of tubular or solid plastic or other fiber reinforced materials having adequate strength and rigidity.

Platform 24 is bolted or otherwise secured at 54 and 56 to members 30 and 32. As most clearly shown in FIG. 4, the side edges 58 and 60 of the front portion of platform 24 are forwardly convergent, and rest upon and are supported by members 30 and 32. The rear portions of platform 24, however, are generally parallel, and extend between ends 48 and 50. Thus, these portions of platform 24 are, in the vehicle illustrated, unsupported by members 30 and 32. In this case, platform 24 should be sufficiently rigid to withstand the weight of the rider without excessive flexure or bending.

Upper and lower sleeve bearings 66 and 68 support steering fork 22 in its rearwardly inclined position for rotational movement about its longitudinal axis. The upper bearing 66 is illustrated in a detailed sectional view in FIG. 5. Bearing 66 includes a sleeve 70 having two annular shoulders 71 (only one, shown), which project radially outwardly from the its ends and form an intervening annular recess. This sleeve surrounds steering fork 22 and, in the example, is held in position by two spaced apart retaining bolts 72 and 74 (FIG. 3) threadably connected to steering fork 22 adjacent the ends of sleeve 70. A band-like retainer 76 is secured at its ends by the same bolting or other securement 53 which secures upper ends 51 and 52, and encircles sleeve 70. The cross sectional outline of retainer 76 registers with that of the sleeve recess at close clearance sufficient to permit rotation of sleeve 70 within retainer 76. The lower sleeve bearing 68 is identical to the upper bearing just described, except that only one retaining bolt 78 (FIG. 3) is used since the front wheel mount provides retention in place of a lower bolt. Accordingly, parts of bearing 68 corresponding to those of bearing 66 will not be described separately.

Still referring to FIGS. 1–4, the lower end of the steering fork terminates in two spaced apart, parallel arms 79 and 80 which mount a stub shaft 82 for supporting front wheel 12. The ends of the stub shaft are capped with press nuts 84 to secure front wheel 12 in position. As most clearly shown in FIG. 3, the steering fork construction raises the front end of body 2 slightly with respect to its rear end, since the axis of rotation of front wheel 12 is offset from the body base, whereas axis 18 is not.

In the example illustrated, rear wheels 14 and 16 are supported by a common axle 86, which is mounted between aligned holes in the rear and lower ends 38, 40, 48 and 50. The ends of axle 86 are capped by press nuts 88 to secure rear wheels 14 and 16 in position. Individual stub shafts, however, could be used to support the rear wheels in place of axle 86, provided the wheels still are aligned for rotation about a common axis.

Side panels 90 and 92 coincide with and enclose sides 6 and 8, respectively. Panels 90 and 92 preferably are composed of stretched ripstop nylon, and are secured to frame members 30, 32, 34 and 36 by appropriate fasteners 94. In the example, each fastener is a self-adherent strip sewn at one end to the associated panel, and is of a length sufficient to encircle the adjacent frame member and secure back upon itself. One such strip suitable for use in this invention is sold under the trademark VELCRO.

Figure 6:
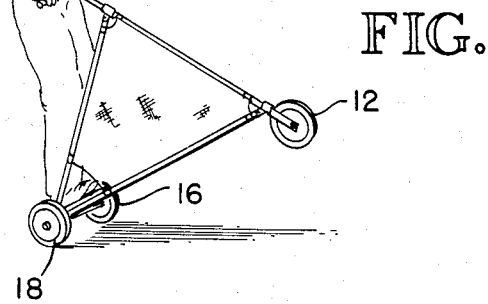
FIGS. 6 and 7 are perspective views, depicting operation of the FIG. 1 vehicle.
Figure 7:
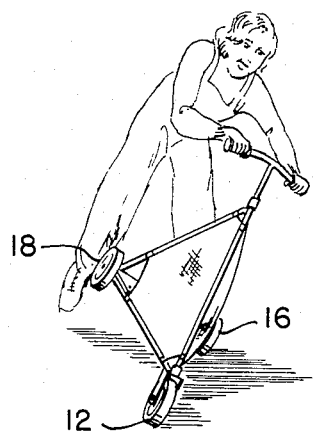

The toy vehicle of this invention may be operated in several positions, two of which are depicted in FIGS. 6 and 7. In FIG. 6, the vehicle is positioned with its front wheel 12 off the ground in a so-called "wheelie." This is accomplished by the rider standing generally erect on the support surface, with his or her weight shifted to or concentrated on the rear portion of the support surface, causing application of a torque tending to raise the front end of the body. Initial application of this torque may be aided by pulling back on the handle bars. The vehicle is balanced at a desired angle of tilt by applying a forward or rearward force to the handle bars, causing application of a counteractive balancing torque to the body via the steering fork.

In FIG. 7, the vehicle is positioned with its right rear wheel 18 off the ground. This is accomplished by the rider standing generally erect in the support surface with his or her weight shifted to or concentrated on the left side of the support surface, causing application of a torque tending to tip the body to the left. Again, as was the case with the FIG. 6 position, initial application of this torque and balancing of the vehicle in the position illustrated may be aided and maintained by application of appropriate forces to the handle bars, except in this case in a lateral direction. The vehicle may be similarly positioned with its left wheel 16 off the ground by shifting weight to or concentrating weight on the right side of the support surface and repeating this process.

Although one presently preferred embodiment of the invention has been illustrated and described herein, variations will become apparent to one of ordinary skill in the art. Accordingly, the invention is not to be limited to the specific embodiments illustrated herein, and the true scope and spirit of the present invention are to be determined by reference to the appended claims.

The embodiments of the invention, in which an exclusive property or privilege is claimed, are defined as follows:

1. A toy vehicle, comprising: a body supporting a front wheel and two rear wheels arranged in a triangular wheelbase; steering means rotatably connected to said front wheel and operative from a position displaced substantially above said rear wheels for turning said front wheel; and support means rigidly mounted to said body and to said steering means; and support surface connected to said body and arranged with respect to said steering means and said two rear wheels that the vehicle may be tilted onto any two of its three wheels at a time and then may be balanced in that position by controlling the application of weight to said support surface and applying a balancing force to said steering means.

2. The vehicle of claim 1, wherein said support is comprised of a pyramid-shaped frame made up of tubular members.

3. A toy vehicle, comprising: a front wheel and two rear wheels arranged in a triangular wheelbase, said front wheel being turnable to steer the vehicle; a pyramid-shaped frame formed of elongated members, one of which is rotatable with respect to the others and supports said front wheel for turning movement, and the others of which are rigidly connected to each other and to said rotatable member and which support said rear wheels for rotation about a common axis; steering means operative from a position displaced substantially above said rear wheels for rotating said rotatable member; and support means mounted by said frame forming a support surface extending between said rear wheels over said axis and terminating at a location spaced from said frame and said axis.

4. A toy vehicle, comprising: a pyramid-shaped frame having a triangularly outlined base and three triangularly outlined sides bounded by four elongated mutually fixed side members and a fifth movable front member rotatively supported from said side members along the intersection of two of said sides; a front wheel mounted by said front member adjacent the corner of said base fronting upon said intersection; and two rear wheels mounted by said fixed members adjacent the other two corners of said base for rotation about a common axis; steering means mounted by said front member generally above said rear wheels for rotating said front member; and means mounted by said frame forming a support surface between said rear wheels in general coplanar alignment with said base and having a rear edge spaced rearwardly from said axis.

5. The vehicle of claim 4 wherein said members are tubular.

6. A toy vehicle, comprising:
(a) a base frame having two spaced apart rear ends and two forwardly convergent coplanar sides;
(b) a support frame having two spaced apart lower ends respectively connected to said base frame adjacent said rear ends, and two upwardly convergent, forwardly inclined coplanar sides;
(c) a rearwardly inclined steering fork supported for rotational movement about its longitudinal axis by said base frame and said support frame;
(d) a steerable front wheel supported by said steering fork for turning movement in response to rotational movement of said steering fork;
(e) steering means mounted by said steering fork and operative to turn said front wheel by imparting rotational movement to said steering fork;
(f) axle means mounted by said base frame adjacent said rear ends;
(g) two spaced apart rear wheels supported by said axle means for rotational movement about a common axis; and
(h) means mounted by said base frame forming a rider support surface between said rear wheels;
(i) said surface having a rear portion terminating at a location spaced rearwardly of said axle means a distance sufficient to cause a torque tending to rotate said base frame upwardly about said axle means to be applied to said base frame in response to a downward force applied to said rear portion;
(j) said steering means being located generally above said rear wheels so that a rider may operate said steering means and may exert forward, rearward and lateral forces on said steering means while standing generally erect on said support surface;
(k) whereby the rider may balance the vehicle in a first tilted position in which said front wheel is lifted off the ground by application of weight to said rear portion while simultaneously controlling the amount of tilt by application of a balancing force to said steering means, and in a second tilted position in which one of said rear wheels is lifted off the ground by application of weight to one side of said surface while simultaneously controlling the amount of tilt by application of a balancing force to said steering means.

7. The vehicle of claim 6, wherein said base frame is generally V-shaped and includes two elongated tubular members connected together at their front ends.

8. The vehicle of claim 6, wherein said support frame is generally V-shaped and includes two elongated tubular members connected together at their front ends.

9. The vehicle of claim 6, wherein said base frame and said support frame each is generally V-shaped and includes two elongated tubular members connected together at their front ends.

10. The vehicle of claim 6, wherein said surface includes a front portion terminating at a location spaced rearwardly of said steering means.

11. The vehicle of claim 10, wherein said front portion has an outline coinciding with the plan profile of said base frame.

12. The vehicle of claim 6, wherein said base frame, said support frame and said steering fork together outline a pyramid-shaped body.

* * * * *